April 21, 1931.  F. H. OWENS  1,801,450
OPTICAL PRINTER
Filed Nov. 12, 1926
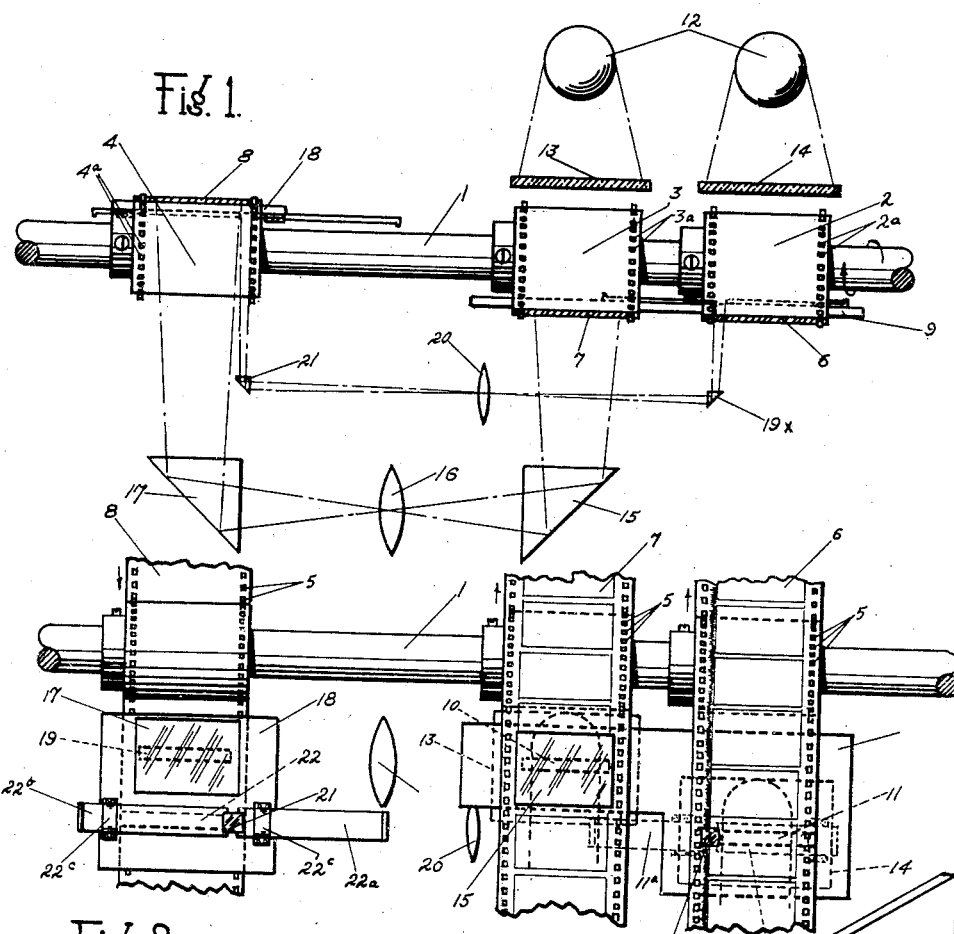
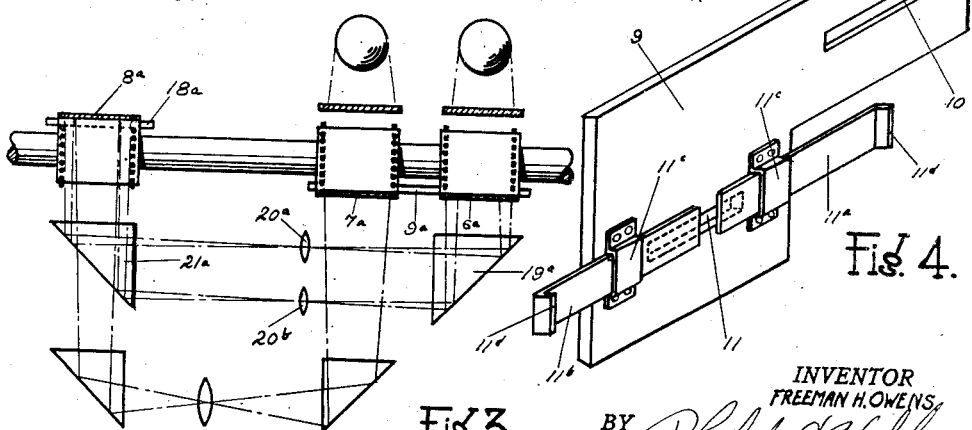
INVENTOR
FREEMAN H. OWENS
BY Philip S. Hopkins
ATTORNEY Patented Apr. 21, 1931

1,801,450

UNITED STATES PATENT OFFICE

FREEMAN H. OWENS, OF NEW YORK, N. Y.

OPTICAL PRINTER

Application filed November 12, 1926. Serial No. 147,979.

My invention refers generally to the type of printer used for printing upon a positive film the images from a negative film. More specifically, my invention pertains to an apparatus for printing moving picture film, usually wound in long lengths or strips with the images thereon in successive relation.

The primary object of my invention is to simultaneously print upon a single positive film, images from two or more separate negative films. This invention is particularly useful for the simultaneous printing upon a single positive film the images of an ordinary strip of negative film, a sound record, identifying information, footage indications, or other data from a separate negative film.

In the embodiment of my invention herein shown, I am enabled to print simultaneously the images from one negative film and certain data from a separate negative film onto a positive film.

A further object of my invention is to provide means for moving all of said strips of film by means of a common shaft whereby they may be uniformly moved at the same speed, and at the same time permit a large saving of space for the apparatus.

A still further object lies in the provision of an adjustable exposure slit for one of the negative film strips and the positive strip, whereby only the desired portion of such negative strip may be printed upon said positive strip. Also by proper adjustment and focusing of the optical system of the printer, such selected portion of the negative strip may be printed upon any desired portion of the positive strip.

My invention also contemplates the simultaneous printing of data from two or more different portions of a negative film on to the positive film simultaneously with the printing of the images from a separate negative film on to the body portion of the same positive film.

Obviously there are many uses and advantages to which my invention may be put and applied, other than those mentioned. Many other objects will appear as the description proceeds, reference now being had to the accompanying drawing, wherein like reference numerals indicate like parts.

Figure 1 is a diagrammatic top plan view of my improved optical printer.

Figure 2 is a front view thereof.

Figure 3 is a top plan view of a modified form of my printer.

Figure 4 is a detail perspective view of my exposure frame provided with the adjustable slit.

All of the figures are diagrammatic in character, the common well known details such as the housing, focusing means, etc. incident to an apparatus of this character having been omitted for the purpose of clearness.

Mounted upon a single shaft 1, adapted to be rotated by a suitable source of power (not shown), are three sprockets, 2, 3 and 4. These sprockets are provided with usual sprocket teeth 2a, 3a, and 4a respectively, adapted to engage within the usual perforations 5 in the negative film strips 6 and 7, and the positive film strip 8.

The negative film strip 7, bearing the usual images, is drawn from any suitable source of supply (not shown) over the sprocket 3 by means of which the film is moved. Similarly is the negative film strip 6, bearing certain data at certain points thereon, as for instance adjacent one edge thereof, which data may be either the name of the manufacturer, footage indication, or a sound record adapted to go with the images on the film strip 7, is moved over the sprocket 2. Both of the negative films 6 and 7 are moved in the same direction and with the sprockets 2 and 3 of the same size, it will be clear that the films will be moved sychronously by the common shaft 1.

Closely adjacent the film strips 6 and 7, is an exposure frame 9 provided opposite the film 7 with a slit 10, extending across the film for the width of the images thereon. Opposite the film strip 6 is a second slit 11, likewise extending across the width of the film.

Slidably mounted on the exposure frame 9 on the side opposite the film strip 6, and adapted to move over the slit 11, are slides 11a and 11b, guided by the straps 11c and provided at their outer ends with the finger pieces 11d. These slides 11a and 11b form masks by means of which any selected or desired data or images on the negative film 6 may be framed for printing.

A source of light 12 is provided for each of the exposure slits or apertures 10 and 11, the rays from such lights passing through diffusing screens or glasses 13 and 14 to the exposure frame 9. The light rays passing through the slits 10 and 11 illuminate the portions of the film strips that move past such slits. The images on the film 7 thus illuminated, are caught by the prism or reflecting medium 15 and turned at right angles, passing through the lens 16 to a second reflector or prism 17, where they are again turned and projected to an exposure frame 18, passing through a slit 19 in such exposure frame and on to the strip 8 of positive film.

The data on the edge of the negative film 6, illuminated by the lamp source 12 through the adjusted or masked slit 11, passes on to the reflecting medium 19, there being turned at right angles, passes through the lens 20 to a second prism or reflector 21 and thence through a second slit 22 in the exposure frame 18, to the edge of the positive film strip 8.

The slit 22 is also provided with masks comprising the adjustable slides 22a and 22b, guided on the frame 18 by the straps 22c, and similar in every respect to the slides 11a and 11b. Obviously if it is desired to project and print data or images from a certain portion of the negative strip 6 to a corresponding portion of the positive strip 8, the slides 11a and 11b, and 22a and 22b, will be adjusted on the exposure frames accordingly. It will be clear also that by properly adjusting the slides and the reflecting mediums 19 and 21, and focusing the lens 20, data from one portion of the negative strip 6 may be projected to any desired portion of the positive strip.

It will be noted that the positive film strip 8, being located on the opposite side of its sprocket 4 from the negative strips 6 and 7, travels in the opposite direction to the negative strips 6 and 7. The sprocket 4 is preferably of the same size as sprockets 2 and 3, thereby lending uniform speed of movement to all three film strips. If desired, the sprocket 4 may be made smaller to accommodate a smaller film. In such event, proper adjustment and focusing of the optical elements would necessarily follow.

In some instances, it may be desirable to print images or data from two or more portions of a negative film, as for instance from both edges thereof, on to both edges of the positive strip. In such event, the exposure frame 9a, (see Figure 3) will be provided with slits adjacent each edge of the film strip 6a.

One or more prisms or reflecting surfaces 19a may be provided to receive and turn the illuminated images thus projected, at an angle, through the lenses 20a and 20b to the second reflecting surface 21a, and then to the edges of the positive film strip 8a through slits (not shown) in the exposure frame 18a. Of course, the exposure slits in this modification may or may not be adjustable, as desired.

From the foregoing, it will be seen that I have provided a new apparatus for simultaneously printing the images from one negative film strip, and sound records, or other images or identifying data from selected portions of a second negative film strip, on to a single positive film strip.

In using the term "negative" film strip, I have referred to a photographic film which has been exposed and developed, and by "positive" film strip, I refer to a photographic sensitized film unexposed and undeveloped.

Of course, many changes may be made in details of construction and arrangement of parts, without departing from the spirit and scope of my invention. I do not limit myself therefore, to the exact structure shown and described, other than by the appended claims.

I claim:—

1. An optical printer comprising a single shaft, sprockets on said shaft, one of which is adapted to move a strip of positive film, separate strips of negative film movable by certain of said sprockets, and optical means for simultaneously projecting images from different portions of said negative strips to said positive strip.

2. An optical printer comprising a single shaft, sprockets on said shaft, one of which is adapted to move a strip of positive film, separate strips of negative film movable by certain of said sprockets, and optical means for simultaneously projecting images from different portions of said negative strips to said positive strip, said sprockets being uniform in size, whereby all of said strips are moved synchronously.

3. An optical printer comprising a single shaft, sprockets on said shaft, one of which is adapted to move a strip of positive film, separate strips of negative film movable by certain of said sprockets, and optical means for simultaneously projecting images from different portions of said negative strips to said positive strip, said sprockets being uniform in size, whereby all of said strips are moved synchronously, said negative strips being moved in the same direction, and said positive strip in the opposite direction.

4. An optical printer comprising a single shaft, sprockets thereon, separate strips of negative film movable by certain of said sprockets, another of said sprockets being adapted to move a single strip of positive film, and optical means for simultaneously projecting images from the central portion of one of said negative strips to the central portion of said positive strip, and from a different portion of another of said negative strips to a corresponding portion of said positive strip.

5. An optical printer comprising strips of negative film, a light source for each strip, an exposure frame between said light source and said strips, slits in said frame adjacent said strips, means for adjustably masking at least one of said slits, means mounted upon a single shaft for actuating said strips, and optical means for projecting images from said negative strips through said slits, to a positive film strip.

6. An optical printer comprising strips of negative film, a light source for each strip, an exposure frame between said light source and said strips, slits in said frame adjacent said strips, means for adjustably masking at least one of said slits, and optical means for projecting images from said negative strips through said slits, to a positive film strip, said masking means comprising slides on said frame, movable over said slit.

7. An optical printer comprising strips of negative film, a light source therefor, an exposure frame between said light source and said negative strips, a second exposure frame between said negative strips and a positive film strip, slits in said exposure frames adjacent said film strips, means comprising a shaft having a plurality of sprockets thereon, each of said strips being actuated by a sprocket, and adjustable masking means for certain of said slits.

8. An optical printer comprising a single shaft having sprockets thereon, one of said sprockets being adapted to move a positive film strip, strips of negative film movable by certain of said sprockets, and optical means for simultaneously projecting images from one portion of one of said negative strips and from separate portions of another negative strip, to said positive strip.

9. An optical printer comprising a single shaft having sprockets thereon, one of said sprockets being adapted to move a positive film strip, strips of negative film movable by certain of said sprockets, and optical means for simultaneously projecting images from one portion of one of said negative strips and from separate portions of another negative strip to corresponding portions of said positive strip.

FREEMAN H. OWENS.